(12) United States Patent
Suzuki

(10) Patent No.: US 6,645,104 B2
(45) Date of Patent: Nov. 11, 2003

(54) ELEMENT FOR BELT FOR CONTINUOUSLY VARIABLE TRANSMISSION

(75) Inventor: Tetsuo Suzuki, Sayama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/864,194

(22) Filed: May 25, 2001

(65) Prior Publication Data

US 2001/0049314 A1 Dec. 6, 2001

(30) Foreign Application Priority Data

May 26, 2000 (JP) ........................................ 2000-155856

(51) Int. Cl.[7] ................................................ F16G 1/22
(52) U.S. Cl. ........................................ 474/242; 474/201
(58) Field of Search ................................ 474/201, 202, 474/237, 238, 242, 244, 265

(56) References Cited

U.S. PATENT DOCUMENTS 4,826,473 A * 5/1989 Miyawaki .................... 474/240
5,154,675 A * 10/1992 Roovers ...................... 474/242

FOREIGN PATENT DOCUMENTS

| EP | 0 460 721 A1 | 12/1991 | | |
|---|---|---|---|---|
| JP | 6357942 | * | 3/1988 | .................. 474/201 |
| JP | 6109077 | * | 4/1994 | .................. 474/201 |
| JP | A-10-169718 | | 6/1998 | |
| WO | WO 99/53218 | | 10/1999 | |

OTHER PUBLICATIONS

Patent Abstract of Japan, Publication No. 08010882, Publication Date Jan. 16, 1996.
Patent Abstract of Japan, Publication No. 1130952, Publication Date Nov. 9, 1999.

* cited by examiner

*Primary Examiner*—Thomas R. Hannon
*Assistant Examiner*—Vicky A. Johnson
(74) *Attorney, Agent, or Firm*—Birch, Stewart, Kolasch & Birch, LLP

(57) ABSTRACT

A body having a thin region in substantially a half lower portion and a head joined to the body by a neck. When the element is blanked out of a metal sheet, an excess amount of metal produced by pressing the substantially half lower portion of the body flows from the body into the metal sheet positioned on an opposite side of the neck and a metal flow is produced into laterally spaced ends of the neck. The head has relatively thick laterally spaced ends and the head and the body have respective thicknesses equal to or smaller than the thickness of the head. The laterally spaced side end regions of the body have a thickness smaller than a thickness of the lower region of the neck in the substantially half upper portion of the body.

5 Claims, 4 Drawing Sheets

ELEMENT FOR BELT FOR CONTINUOUSLY VARIABLE TRANSMISSION

BACKGROUND OF THE INVENTION

1. Field of the Invention

The present invention relates to an element for a belt for use in a continuously variable transmission and a method of blanking such an element out of a metal sheet.

2. Description of the Related Art

Elements for belts for use in continuously variable transmissions (CVTs) comprise a body having V-shaped surfaces for contact with CVT pulleys and a head joined to an upper edge of the body. The head has a pair of ears projecting laterally away from each other in confronting relation to the upper edge of the body. The ears positioned on the opposite sides of the neck and the body jointly define a pair of recesses therebetween. The body has a thin region in its substantially half lower portion whose thickness is progressively reduced toward a lower edge thereof. A plurality of such elements are transversely stacked in an annular shape and bound together by a pair of endless rings in the form of metal webs that are disposed in the recesses, respectively, thus making up a belt. With the elements put together in annular form, the bodies thereof are positioned on the inner circumferential side of the belt and the heads thereof are positioned on the outer circumferential side of the belt.

An element of the type described above is blanked out of an elongate metal sheet by pressing a punch against the metal sheet that is placed on the die of a press. When the punch is pressed against the metal sheet, a counterpunch is simultaneously held against the reverse side of the metal sheet to press the substantially half lower portion of the body into a thin region having a desired cross-sectional shape. Several hundreds of blanked elements are stacked together into an annular shape, and endless rings are inserted into the recesses in the elements, thereby making up a belt for use in continuously variable transmissions.

When such a belt is trained around a pair of pulleys of a continuously variable transmission and turned around the pulleys, it is preferable that the elements be held more closely together at their bodies than at their heads while traveling in an arcuate path around the pulleys and be held in a linearly stacked state while traveling in a path between the pulleys. In order to allow the elements to move smoothly along the arcuate path along the pulleys, the thin region of each of the elements is formed to a nicety by the counterpunch at the time of blanking the element.

When the substantially half lower portion of the body is pressed into the thin region by the counterpunch, however, an excess amount of metal is forced to flow from the lower portion into the upper portion of the body, thereby enlarging the upper portion of the body and hence increasing the thickness thereof. If the thickness of the upper portion of the body is increased until it becomes greater than the thickness of the head including the ears, then the body becomes thicker than the head. With the body being thicker than the head, the elements tend to be held more closely together at their heads than at their bodies while traveling in the path between the pulleys, and are difficult to be kept in a linearly stacked state between the pulleys. As a result, the belt which is traveling between the pulleys is liable to be twisted, and fails to transmit stable power in the continuously variable transmission. In addition, the endless rings in the recesses are likely to be forced into contact with the lower edges of the ears, damaging the elements and the endless rings themselves.

SUMMARY OF THE INVENTION

It is therefore an object of the present invention to provide an element for a belt for use in a continuously variable transmission, which can be held in a well stacked state in a belt for transmitting stable power in the continuously variable transmission, and a method of blanking such an element out of a metal sheet with utmost ease.

To achieve the above object, there is provided in accordance with the present invention an element for a belt for use in a continuously variable transmission, comprising a body adapted to be positioned on an inner circumferential side of an annular assembly of transversely stacked elements, the body having laterally spaced side edges for contact with pulleys of the continuously variable transmission, the body having a thin region in a substantially half lower portion thereof which has a thickness smaller than the thickness of another portion of the body, and a head joined to a central upper edge of the body by a neck and adapted to be positioned on an outer circumferential side of the annular assembly, the head having laterally spaced side end regions positioned on opposite side of an upper region of the neck and having a thickness greater than the thickness of the upper region of the neck, the head and the body having respective thicknesses equal to or smaller than the thickness of the laterally spaced side end regions of the head, the body including a substantially half upper portion exclusive of the thin region, and having laterally spaced side end regions positioned on opposite side of a lower region of the neck, the laterally spaced side end regions of the body having a thickness smaller than the thickness of the lower region of the neck in the substantially half upper portion of the body.

When a plurality of produced elements are stacked into an annular shape for use as a belt for a continuously variable transmission, the neck and the body that are as thick as or thinner than the head allow the belt to bend smoothly radially inwardly, and the elements are kept in a well stacked state without the danger of becoming closer together at the heads. When the belt is trained around pulleys of the continuously variable transmission, the belt is prevented from being displaced radially outwardly, but permits the transmission of stable power in the continuously variable transmission without damage to endless rings inserted in recesses defined in the elements and also to the elements. When the elements are stacked into the annular shape, since relatively thick regions of the elements, i.e., the laterally spaced side end regions of the head and the lower region of the neck, contact those of adjacent ones of the elements, the elements are maintained in a highly stable stacked state. The belt for use in the continuously variable transmission is prevented from traveling in a tortuous path, but can transmit power efficiently.

According to the present invention, there is also provided a method of blanking an element for a belt for use in a continuously variable transmission, having a body adapted to be positioned on an inner circumferential side of an annular assembly of transversely stacked elements, the body having laterally spaced side edges for contact with pulleys of the continuously variable transmission, the body having a thin region in a substantially half lower portion thereof which has a thickness smaller than the thickness of another portion of the body, and a head joined to a central upper edge of the body by a neck and adapted to be positioned on an outer circumferential side of the annular assembly, the method comprising the steps of providing a forming punch for pressing a metal sheet placed on a die from an upper surface thereof to blank the element out of the metal sheet and a counterpunch for engaging a lower surface of the element blanked by the forming punch to apply a counter load to press the substantially half lower portion of the body into the thin region of a predetermined cross-sectional shape, the counterpunch being downwardly movable in unison with the element, pressing the metal sheet with the forming punch and pressing the substantially half lower portion of the body into the thin region under the counter load which is applied by the counterpunch to counter a pressing load which is applied by the forming punch, causing an excess amount of metal, which is produced when the metal sheet is pressed by the forming punch and the substantially half lower portion of the body is pressed into the thin region under the counter load which is applied by the counterpunch to counter the pressing load which is applied by the forming punch, to flow from the body into the metal sheet positioned on opposite sides of the neck, and blanking the element out of the metal sheet by separating the metal sheet, into which the excess amount of metal has flowed when the metal sheet is pressed by the forming punch, from the body, while a substantially central region of the head is being pressed to produce a metal flow into laterally spaced side end regions of the head, for thereby forming the element in which the thickness of the laterally spaced side end regions of the head positioned on opposite sides of an upper region of the neck is greater than the upper region of the neck, the head and the body have respective thicknesses equal to or smaller than the thickness of the head, and the body includes a substantially half upper portion exclusive of the thin region, and has laterally spaced side end regions positioned on opposite side of a lower region of the neck, the laterally spaced side end regions of the body having a thickness smaller than the thickness of the lower region of the neck in the substantially half upper portion of the body.

With the above method, the excess amount of metal produced when the substantially half lower portion of the body is pressed into the thin region by the forming punch is caused to flow into the metal sheet between the body and the head under the counter load applied by the counterpunch, and thereafter the metal sheet into which the excess amount of metal has flowed is separated from the body. Therefore, the excess amount of metal does not remain in the body and hence does not enlarge the body, and the body is prevented from unduly increasing in the thickness. The excess amount of metal produced in the lower region of the neck in the substantially upper half portion of the body is displaced into and distributed in the neck, and any metal flow into the metal sheet to be separated is small. The thickness of the laterally spaced side end regions of the body which are positioned on opposite sides of the lower region of the neck in the substantially upper half portion of the body is easily made smaller than the lower region of the neck in the substantially upper half portion of the body.

Since the excess amount of metal produced in the body is easily caused to flow out of the element or distributed in the neck under the pressing load from the forming punch and the counter load from the counterpunch, the thickness of the laterally spaced side end regions of the head can be increased, and the thickness of the body can easily be made smaller than the thickness of the head. At the same time, the thickness of the laterally spaced side end regions of the body which are positioned on opposite sides of the lower region of the neck in the substantially upper half portion of the body is easily made smaller than the lower region of the neck in the substantially upper half portion of the body. When a plurality of such elements are stacked into an annular form as a belt for a continuously variable transmission, the elements are kept in a well stacked state without the tendency to bend toward the heads.

Preferably, the method may further comprise the step of pressing the metal sheet against the die with a pad under a pressing load which is set to allow the excess amount of load produced under the pressing load applied by the forming punch and the counter load applied by the counterpunch to flow from the body. This step allows the excess amount of metal produced in the body to flow smoothly out of the element.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 2(*b*) is a cross-sectional view illustrative of another phase of the blanking process which follows the phase shown in FIG. 2(*a*);

FIG. 3(*b*) is a cross-sectional view illustrative of still another phase of the blanking process which follows the phase shown in FIG. 3(*a*);

FIG. 3(*c*) is a cross-sectional view illustrative of yet another phase of the blanking process which follows the phase shown in FIG. 3(*b*);

FIG. 3(*d*) is a cross-sectional view illustrative of yet still another phase of the blanking process which follows the phase shown in FIG. 3(*c*);

FIG. 4(*b*) is a view showing the element as viewed in the direction indicated by the arrow b in FIG. 4(*a*).

DETAILED DESCRIPTION OF THE EMBODIMENT

Figure 4A:
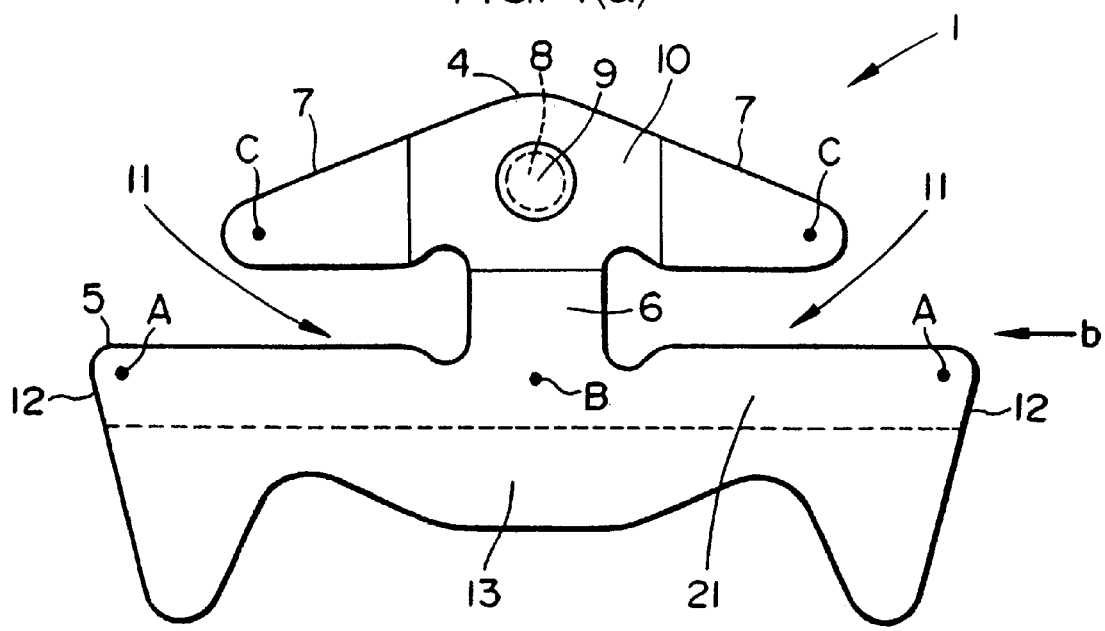
FIG. 4(*a*) is a plan view of an element according to the present invention.

A blanking method according to the present invention is used to manufacture an element 1 (see FIGS. 4(*a*) and 4 (*b*)) for a belt for use in a continuously variable transmission (not shown). A plurality of elements 1 are stacked into an annular shape, and bound together by endless rings of metal, thus producing a belt for use in a continuously variable transmission.

Figure 1:
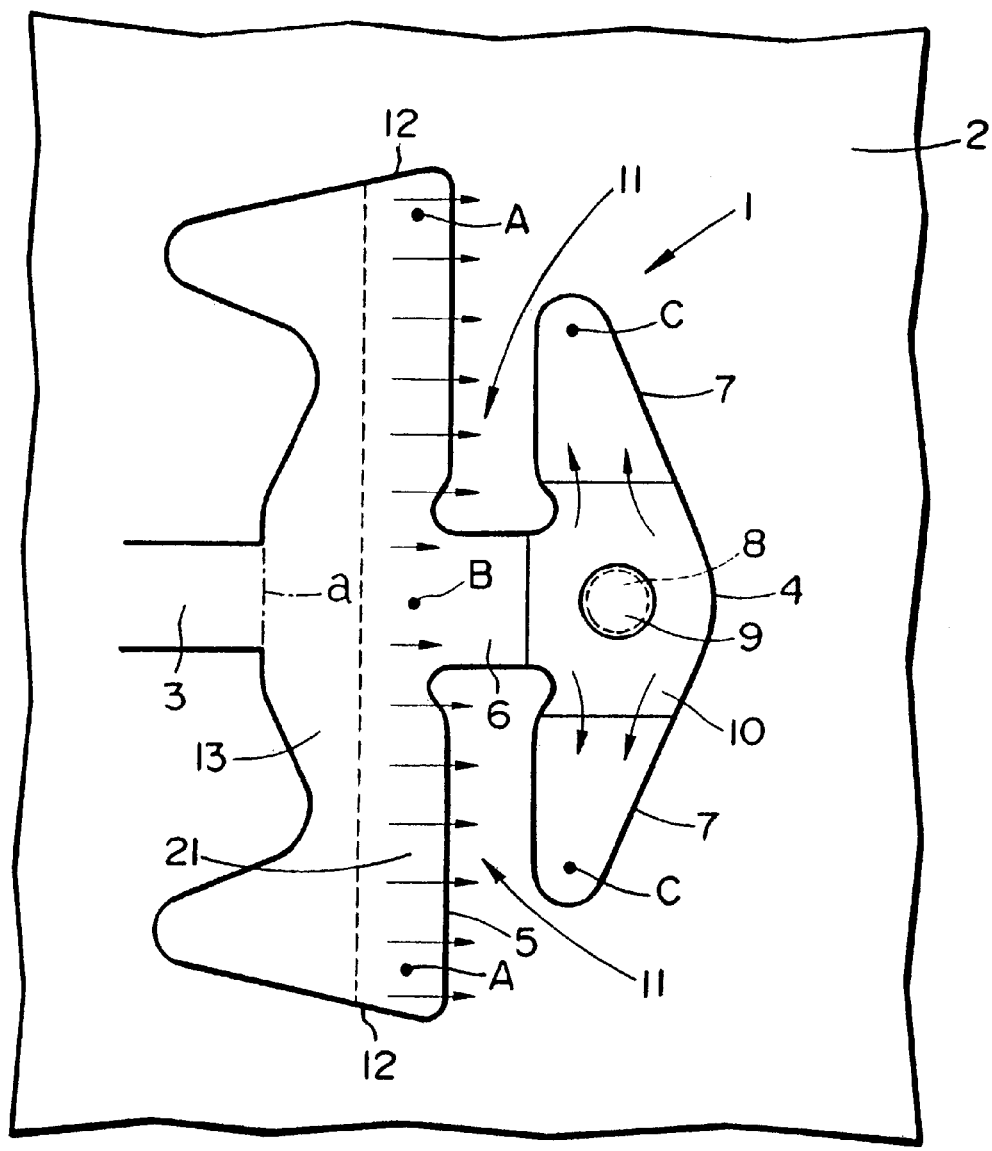
FIG. 1 is a plan view showing a shape to be blanked out of a metal sheet according to the present invention.

As shown in FIG. 1, the element 1 is blanked out of a metal sheet 2. When the element 1 is blanked, it remains connected to the metal sheet 2 by a joint 3. Thereafter, the joint 3 is cut off from the metal sheet 2 along a boundary between the joint 3 and the element 1 as indicated by the imaginary line a in FIG. 1, thus separating the element 1 from the metal sheet 2.

The shape of the element 1 thus blanked and separated will briefly be described below with reference to FIGS. 4(*a*) and 4(*b*). The element 1 comprises a head 4 which will be positioned on an outer circumferential edge of the belt for use in the continuously variable transmission, and a body 5 which will be positioned on an inner circumferential edge of the belt. The head 4 and the body 5 are integrally joined to each other by a neck 6. The head 4 has a pair of ears 7 on its opposite sides which project laterally along an upper edge of the body 5. The head 4 also has a nose 8 and a hole 9 substantially centrally on its opposite surfaces. When a plurality of elements 1 are stacked together, the nose 8 of each element 1 engages in the hole 9 of an adjacent element 1. The head 4 has a slight cavity 10 defined in a central region around the hole 9 for reliable engagement with the nose 8. The cavity 10 makes the central region of the head 4 slightly thinner than the ears 7.

The ear 7, the body 5, and the neck 6 joined therebetween jointly define a pair of recesses 11 between the ears 7 and the body 5 and on opposite sides of the neck 6. When the continuously variable transmission is assembled, the endless belts are inserted in the respective recesses 11. The body 5 has a pair of laterally spaced pulley contact surfaces (V-shaped surfaces) 12 on its opposite ends for contact with a pulley, not shown, of the continuously variable transmission. The body 5 has a thin region 13 in its substantially half lower portion whose thickness is progressively reduced toward a lower edge thereof.

Figure 2A:
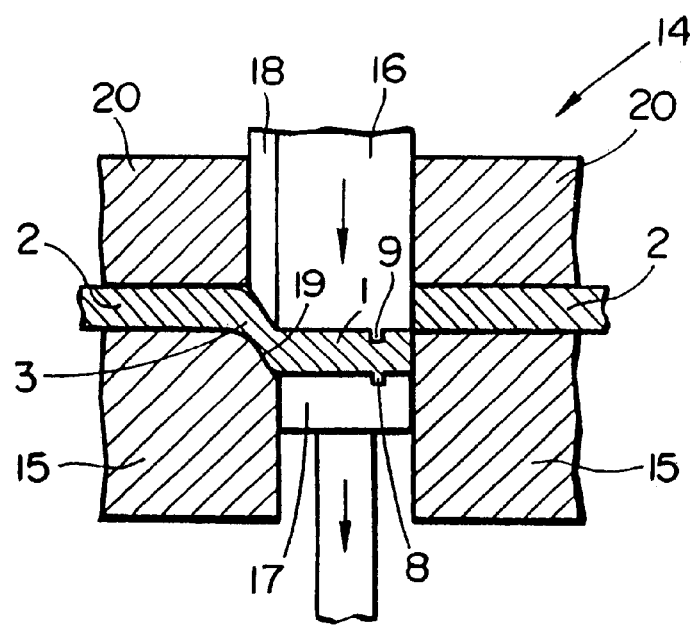
FIG. 2(*a*) is a cross-sectional view illustrative of a phase of a blanking process according to the present invention.
Figure 2B:
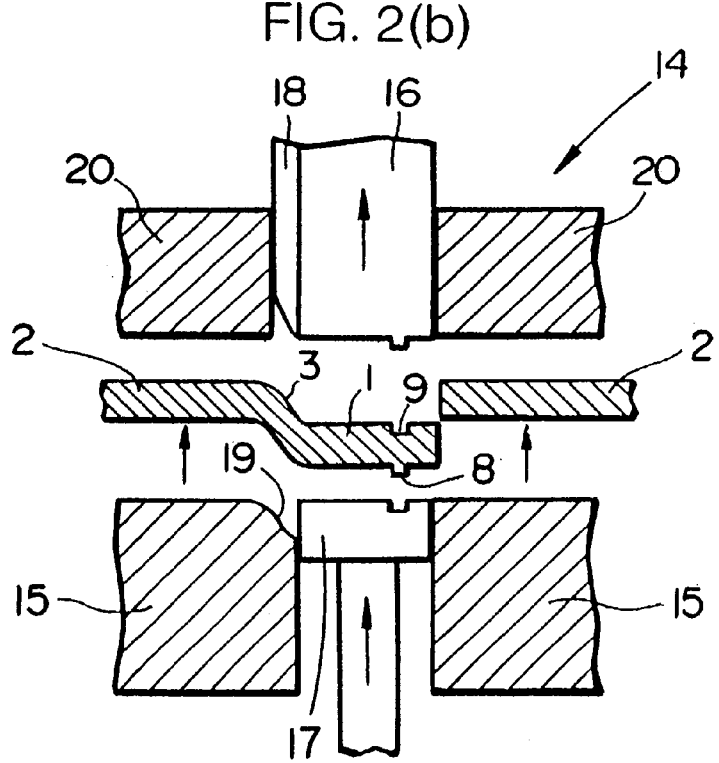

A blanking process for blanking the element 1 out of the metal sheet 2 will be described below. As shown in FIGS. 2(a) and 2(b), the element 1 is blanked by a press 14 having a die 15 and an element forming punch 16 for blanking an element out of a metal sheet 2 placed on the die 15. A counterpunch 17 is disposed below the element forming punch 16 in vertically confronting relation thereto. The counterpunch 17 is movable downwardly in unison with the element forming punch 16. A joint forming punch 18 for forming the joint 3 is disposed on one side of the element forming punch 16. The die 15 has a clearance 19 defined in a portion thereof which is in vertical alignment with the joint forming punch 17. A pad 20 for pressing the metal sheet 2 against the die 15 is disposed above the die 15.

In the blanking process, the metal sheet 2 placed on the die 15 is fixedly pressed against the die 15 by the pad 20. Then, as shown in FIG. 2(a), while the metal sheet 2 is borne by the counterpunch 17 from below the metal sheet 2, the element forming punch 16 is lowered to blank the element 1 out of the metal sheet 2 in coaction with the die 15. At the same time, the joint forming punch 18 lowered in unison with the element forming punch 16 and the clearance 19 of the die 15 positioned in vertical alignment wit the joint forming punch 18 jointly produce the joint 3 between the element 1 and the metal sheet 2.

Figure 3A:
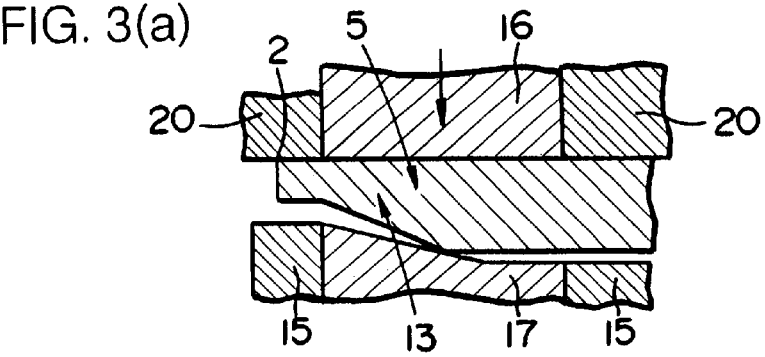
FIG. 3(*a*) is a cross-sectional view illustrative of a phase of the blanking process according to the present invention.
Figure 3B:
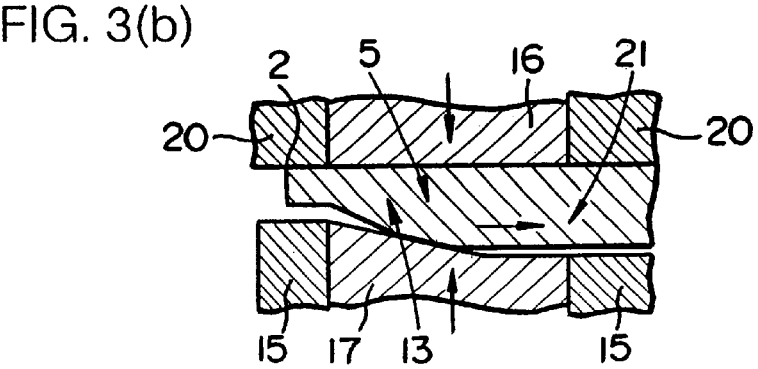

As shown in FIGS. 3(a) through 3(d), until the portion of the element 1 except the joint 3 is blanked out of and separated from the metal sheet 2, the following process is carried out by the element forming punch 16: As shown in FIGS. 3(a) and 3(b), the thin region 13 of the body 5 is pressed into a desired cross-sectional shape under the pressing load applied by the element forming punch 16 and the counter load applied by the counterpunch 17. When the thin region 13 of the body 5 is pressed, an excess amount of metal flows from the thin region 13 into a substantially half upper portion 21 of the body 5.

Figure 3C:
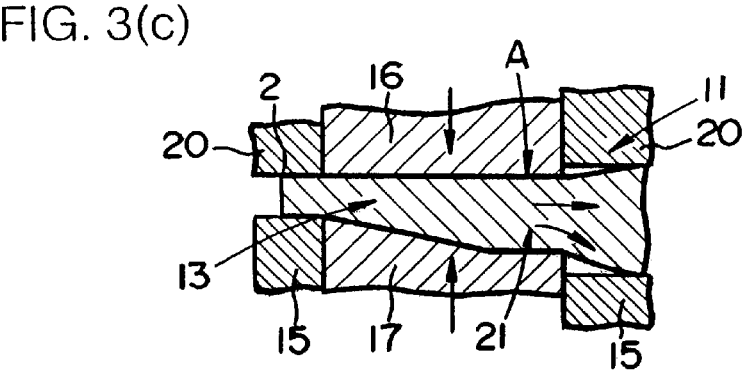

Then, as shown in FIG. 3(c), the excess amount of metal flows toward the head 4 under the pressing load applied by the element forming punch 16 and the counter load applied by the counterpunch 17 (see the arrows in FIG. 1). At opposite positions, particularly at points A in FIG. 1, on the opposite sides of the body 5, the excess amount of metal flows into the metal sheet 2 located in the recesses 11. While the pressing load is being applied from the pad 20 to the metal sheet 2 located in the recesses 11, the magnitude of the applied load is selected so as not to prevent the excess amount of metal from flowing from the body 5, thereby allowing the excess amount of metal to flow from the body 5 into the metal sheet 2 located in the recesses 11.

An excess amount of metal produced in a region, particularly at a point B in FIG. 1, of the body 5 below the neck 6, does not flow into the metal sheet 2 located in the recesses 11, but flows in and along the neck 6 toward the head 4. At this time, the thickness at the points A becomes smaller than the thickness at the point B.

When the head 4 is pressed by the element forming punch 16, the nose 8 and the hole 9 are formed on the head 4. In addition, a region around the hole 9 is slightly compressed to produce the cavity 10. When the region around the hole 9 is compressed, an excess amount of metal flows therefrom into the ears 7. In the ears 7, particularly at points C in FIG. 1, the thickness becomes greater than the original thickness of the metal sheet 2. As a consequence, the thickness at the points B becomes equal to the thickness at the points C, or the thickness at the points C becomes greater than the thickness at the points B.

Figure 3D:
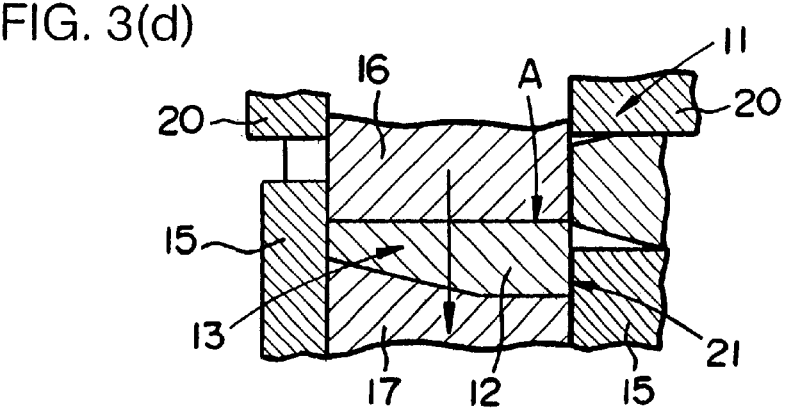

As shown in FIG. 3(d), when the element 1 is blanked out of the metal sheet 2, the excess amount of metal that has flowed into the metal sheet 2 in the recesses 11 remains in the metal sheet 2 in the recesses 11 and is separated from the element 1.

Then, as shown in FIG. 2(b), the element forming punch 16, the joint forming punch 18, the counterpunch 17, and the pad 20 are elevated. The metal sheet 2 with the element 1 joined thereto by the joint 3 is removed from the press 14, and the joint 3 is cut off, thus fully separating the element 1 from the metal sheet 2.

Figure 4B:
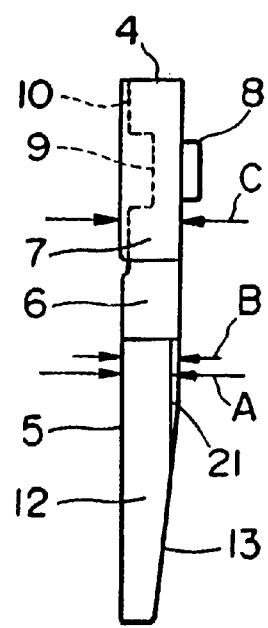

As shown in FIG. 4(b), the thickness at the points A on the element 1 thus formed is reliably smaller than the thickness at the point B, and the thickness at the points B becomes equal to or smaller than the thickness at the points C. When a plurality of elements 1 thus formed are stacked into an annular shape for use as a belt for a continuously variable transmission, they remain in a stably stacked state due to contact therebetween at the points C and the points B. Since the elements 1 are reliably prevented from being held more closely together at their heads 4 than at their bodies 5, the elements 1 are protected against damage owing to undue contact with the endless rings at the time the belt is trained around pulleys of the continuously variable transmission, which is thus allowed to transmit stable power.

Although a certain preferred embodiment of the present invention has been shown and described in detail, it should be understood that various changes and modifications may be made therein without departing from the scope of the appended claims.

What is claimed is:

1. An element for a belt for use in a continuously variable transmission, comprising:

a body adapted to be positioned on an inner circumferential side of an annular assembly of transversely stacked elements, said body having laterally spaced side edges for contact with pulleys of the continuously variable transmission, said body having a thin region in a substantially half lower portion thereof which has a thickness smaller than the thickness of another portion of the body; and a head joined to a central upper edge of the body by a neck and adapted to be positioned on an outer circumferential side of the annular assembly, said head having laterally spaced side end regions positioned on opposite side of an upper region of said neck and said laterally spaced side regions having a thickness greater than the thickness of the upper region of said neck;

said head and said body having respective thicknesses equal to or smaller than the thickness of the laterally spaced side end regions of said head;

said body including a substantially half upper portion exclusive of said thin region, and having laterally spaced side end regions positioned on opposite side of a lower region of said neck, said laterally spaced side end regions of said body having a thickness smaller than the thickness with regard to a direction perpendicular to a face of the element of the lower region of said neck in the substantially half upper portion of said body.

2. The element according to claim 1, wherein the laterally spaced side end regions of the head and the lower region of the neck contact those of adjacent one of the elements.

3. The element according to claim 1, wherein the laterally spaced side end regions of the body have a predetermined thickness adjacent to the end regions of the body that is smaller relative to the thickness of the lower region of the neck adjacent to the central upper edge of the body.

4. The element according to claim 1, wherein the thickness of the lower region of the neck adjacent to the central upper edge of the body has a predetermined thickness that is equal to or smaller than the laterally spaced side end regions of the head.

5. The element according to claim 1, and further including a nose and a hole being formed in said head wherein the nose of one element mates with a hole of an adjacent element.

* * * * *